SELECTIVE CIRCUIT

Filed May 27, 1949

INVENTOR
Walter Lyons
BY Harry Tunick
ATTORNEY

Patented Sept. 22, 1953

2,653,194

UNITED STATES PATENT OFFICE 2,653,194

SELECTIVE CIRCUIT

Walter Lyons, Flushing, N. Y., assignor to Radio Corporation of America, a corporation of Delaware Application May 27, 1949, Serial No. 95,623

2 Claims. (Cl. 179—171)

This invention relates to selective circuits, and more particularly to a selective circuit utilizing piezoelectric crystals.

An object of this invention is to devise a relatively inexpensive arrangement for obtaining high selectivity in an electrical circuit.

Another object is to provide a circuit arrangement wherein variable selectivity can be realized in a simple manner.

A further object is to devise a means for obtaining high selectivity in an electrical circuit without resort to the use of multiple heterodyne circuits, complicated filter arrangements or tuned circuits.

The foregoing and other objects of the invention will be best understood from the following description of an exemplification thereof, reference being had to the accompanying drawings, wherein.

Figures 1, 2, 3:
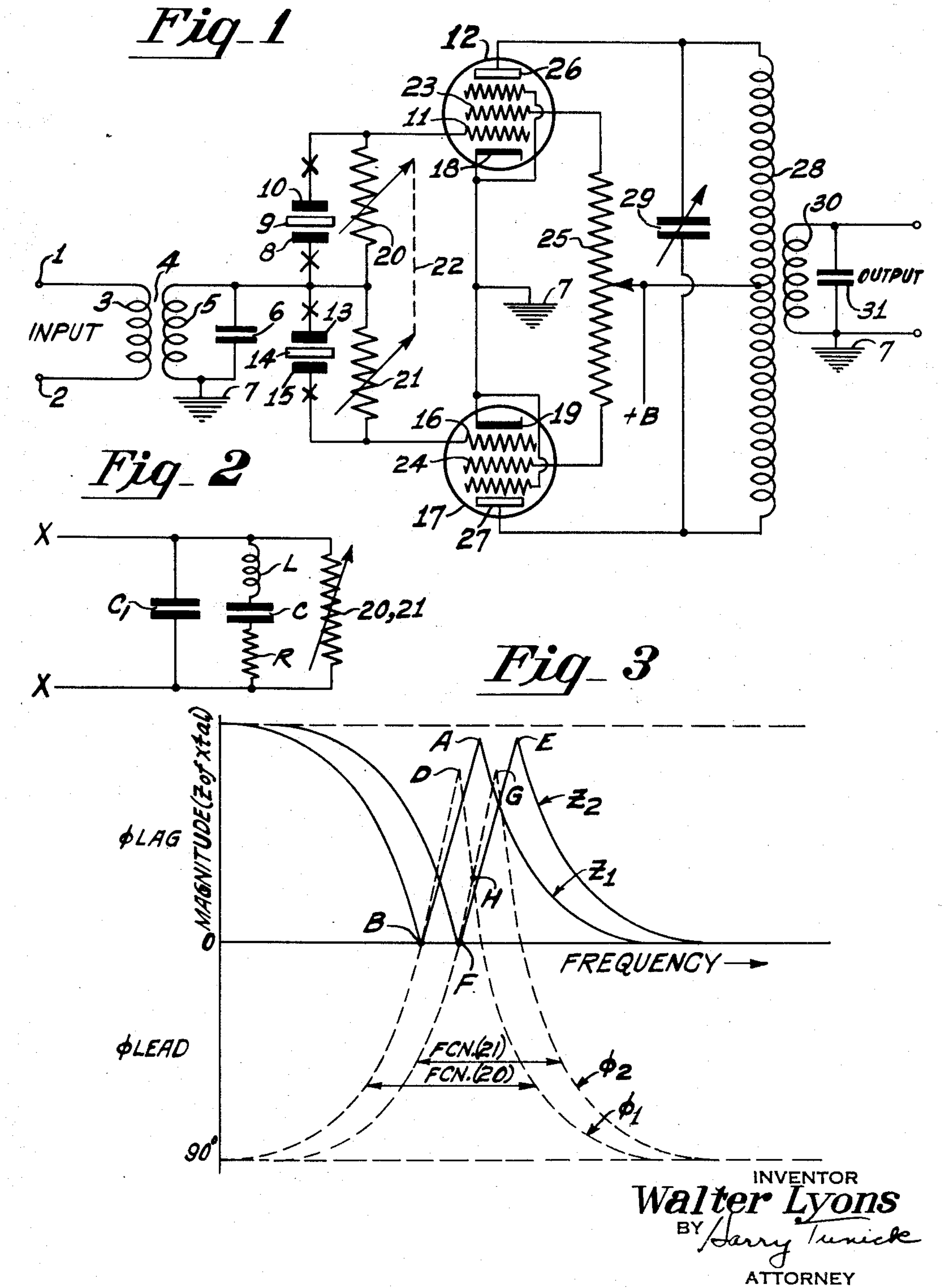
Fig. 1 is a diagrammatic representation of an arrangement according to this invention.
Fig. 2 is an equivalent electrical circuit for a portion of Fig. 1.
Fig. 3 is a set of curves useful in explaining the operation of Fig. 1.

The objects of this invention are accomplished, briefly, in the following manner:

A source of signal potentials is connected to supply potentials through two series paths to the control grids or input circuits of two separate pentodes the outputs of which are connected in phase opposition to a common output winding, each series path having therein a corresponding crystal. The resonant frequenices of the two crystals are slightly different from each other. A variable resistor is connected in shunt with each of the crystals, these two resistors being ganged together or variable in unison to vary the bandwidth of the selective circuit. Outside the pass band of the circuit, the outputs of the two crystals will be substantially equal in magnitude and phase and cancellation will be obtained in the common output, while at frequenices within the pass band, the outputs of the two crystals will be substantially unequal, giving a net output in the common output circuit or load.

Now referring to Fig. 1, input signals, such as high frequency or intermediate frequency signal potentials, are applied between input terminals 1 and 2 of the circuit, across primary winding 3 of a suitable input transformer 4 the secondary winding 5 of which is tuned by a condenser 6 and one end of which is grounded at 7. The ungrounded or high potential end of winding 5 is connected to one electrlode 8 of a piezoelectric crystal 9, the other electrode 10 of which is connected directly to the control grid 11 of a pentode 12; in this manner the incoming or input signal potential is applied through crystal 9 which is in a series path between the potential source 5 and control grid 11. The high potential end of winding 5 is also connected to one electrode 13 of another piezoelectric crystal 14 the other electrode 15 of which is connected directly to the control grid 16 of a second pentode 17; in this way the input signal potential is also applied through crystal 14 which is in a second series path between potential source 5 and control grid 16. Thus, a common input source supplies signals to the two crystals in phase, and through the crystals in phase to the two control grids. In order to complete the input circuit for tubes 12 and 17, the respective cathodes 18 and 19 thereof are connected to ground 7, it being remembered that the low potential end of input source winding 5 is also grounded.

The resonant frequencies of the crystals 9 and 14 are somewhat different from each other, and the two resonant frequencies are selected to lie on opposite sides of the center frequency of the pass band of the selective circuit, this pass band resulting from the operation that will be explained hereinafter. Except for their resonant frequencies, both crystals in their holders are substantially identical. A variable resistor 20 has its opposite ends connected to electrodes 8 and 10 to shunt crystal 9, while a substantially identical variable resistor 21 has its opposite ends connected to electrodes 13 and 15 to shunt crystal 14. The resistors 20 and 21 are ganged together, as indicated at 22, to make them variable in unison. The suppressor grids of pentodes 12 and 17 are connected to their corresponding cathodes in the conventional manner, while the respective screen grids 23 and 24 are connected to opposite ends of a potentiometric resistor 25 the movable tap of which is connected to a suitable source of positive potential.

The respective anodes 26 and 27 of pentodes 12 and 17 are connected to opposite ends of a common output winding 28, thereby connecting the outputs of these two pentodes in phase opposition to a common output circuit. A variable shunt condenser 29 tunes winding 28, while positive anode potential is supplied from the positive source to anodes 26 and 27 through a connection from such source to a midtap on winding 28. A winding 30 is coupled to winding 28 to supply output voltages from the circuit of this invention to a load, winding 30 having one end thereof grounded at 7 and being tuned by a shunt condenser 31. If desired, output from this circuit may be supplied to an input or grid circuit of a succeeding amplifier stage.

As far as an electrical circuit associated with a vibrating crystal is concerned, the crystal can be replaced by the electrical network of Fig. 2, in which points marked X, X correspond to similarly-marked points in Fig. 1. In Fig. 2, $C_1$ represents the electrostatic capacity between the crystal electrodes when the crystal is in place but not vibrating, and the series combination L, C and R represents the equivalent mass, compliance, and frictional loss of the vibrating crystal, respectively. The variable resistor denoted by 20, 21 in Fig. 2 represents either one of the ganged crystal loading resistors connected across points X—X in Fig. 1.

The impedance offered by one of the crystals, say crystal 9, to the electrical circuits including the common source circuit 5, 6, etc., accordingly is of the character of curve $Z_1$ in Fig. 3, being high at point A, which is the resonant frequency of L and $C+C_1$ and low at point B, which is a nearby frequency for which L and C are in series resonance. At frequencies somewhat below or to the left of point B, the impedance curve $Z_1$ again rises to a high value, while at frequencies somewhat above or to the right of point A said impedance curve again drops to a low value. In Fig. 3, the curves are plots of impedance versus frequency (solid-line curves) and phase versus frequency (dotted-line curves) for the two crystals 9 and 14. The curve $\phi_1$ represents the variation of effective phase angle with frequency of crystal 9. This curve rises to a peak or maximum at point D, corresponding to a frequency extremely close to the frequency value at point A, passing through zero at point B and also at the frequency value of point A.

The impedance offered by crystal 14 to the electrical circuits including the circuit from the common source is represented by curve $Z_2$, being high at point E and low at point F, rising to a high value to the left of point F and falling to a low value to the right of point E. It should be noted that curves $Z_1$ and $Z_2$ are substantially identical in shape and are displaced somewhat from each other horizontally or along the frequency axis. This is so because the resonant frequencies of the crystals 9 and 14 are made to be slightly different from each other, the two crystals in their holders being substantially identical except for their resonant frequencies. The curve $\phi_2$ represents the variation of effective phase angle with frequency of crystal 14, rising to a peak at point G, corresponding to a frequency extremely close to the frequency value at point E, passing through zero at point F and also at the frequency value of point E.

The resonant frequencies of the crystals 9 and 14 are approximately at points D and G, respectively, and the center frequency of the pass band of the circuit is intended to be approximately at the frequency value of point H; therefore, the resonant frequencies of the crystals are offset with respect to the center frequency of the pass band, one being located on each side of such center frequency.

At frequencies not far below the resonant frequencies of the crystals, and on down to zero frequency, the curves $Z_1$ and $Z_2$ both approach asymptotically the same high impedance value, and curves $\phi_1$ and $\phi_2$ both approach asymptotically the same phase value, which is 90° leading, due to the substantial identity of the two crystals. Therefore, at frequencies not far removed from the resonant frequencies of the crystals on the low frequency side, and on down to zero frequency, the output of crystal 9 will be substantially equal in magnitude and phase to that of crystal 14, due to the identity of crystal impedances and effective phase angles at such frequencies. Since the outputs of the two pentodes 12 and 17 are connected in phase opposition in regard to winding 28, substantially complete cancellation of these crystal outputs (or grid input potentials to the pentodes) will be obtained across the output load 30, for inputs in winding 5 of frequencies not far below the predetermined resonant frequencies of the crystals and on down to zero frequency.

At frequencies not far above the resonant frequencies of the crystals, and on up to infinite frequency, the curves $Z_1$ and $Z_2$ both approach asymptotically the zero axis, and curves $\phi_1$ and $\phi_2$ both approach asymptotically the same 90° leading phase value, due to the substantial identity of the two crystals. Therefore, at frequencies not far removed from the resonant frequencies of the crystals on the high frequency side, and on up to infinite frequency, the output of crystal 9 will be substantially equal in magnitude and phase to that of crystal 14, due to the identity of crystal impedances and effective phase angles at such frequencies. Again, substantially complete cancellation of these crystal outputs (or grid input potentials to the pentodes) will be obtained across the output load 30, for inputs in winding 5 of frequencies not far above the predetermined resonant frequencies of the crystals and on up to infinite frequency.

It will be noted from Fig. 3 that, at input frequencies immediately adjacent the crystal resonant frequencies, and within the pass band of the circuit, the impedances and effective phase angles of the two crystals are in general different from or unequal to each other. Therefore, within the pass band the outputs of the two crystals (or the pentode grid input signals) will differ from each other in magnitude or in phase or both, and as a result cancellation of the signals across the output load will no longer obtain, giving a resultant signal in output winding 30 in response to input signals within the pass band of the circuit.

According to my present understanding of the operation of the invention, it is believed that, for input frequencies within the pass band of the selective circuit, the inequalities in phase, represented by the horizontal displacement of curves $\phi_1$ and $\phi_2$ from each other, play a larger part in achieving non-cancellation and a resultant output than do the inequalities in signal magnitude, represented by the horizontal displacement of curves $Z_1$ and $Z_2$ from each other. However, even at points such as H, where the two curves $\phi_1$ and $\phi_2$ cross each other, and at which the phases of the crystal outputs are the same, there will still be a resultant output in common winding 28 because of the difference in crystal impedances at such frequency and the consequent difference in magnitudes of the crystal outputs at this frequency, it being remembered that the crystal output is the input to the control grids of the pentodes.

It has been determined that, due to inherent characteristics of crystals such as the high Q thereof, an extremely narrow bandwidth may be expected with the selective circuit of this invention. For example, when a circuit according to this invention is used in an amplifier, a bandwidth on the order of only 100 cycles may be realized for a carrier frequency of 50 kilocycles. This means that very high selectivity may be achieved, with a relatively simple and inexpensive crystal arrangement not using multiple heterodyne circuits, complicated filter arrangements or tuned circuits.

Considering Fig. 2 again, it may be seen that the variable ganged resistors 20, 21 are shunted across the corresponding crystals, and these resistors may be considered as means for loading the crystals. As indicated in Fig. 3, the width of each of the phase curves $\phi_1$ and $\phi_2$ is a function of the value of the corresponding loading resistor 20 or 21. By variation of the identically-variable resistors 20 and 21, the resonant to anti-resonant characteristics of the crystal units are varied in like manner to vary the bandwidth of the selective circuit. More specifically, the width of the phase curve, being a function of the value of the corresponding shunting resistor, may be varied by variation of such resistor, with a corresponding variation of the impedance curve appropriate thereto; by varying resistor 20, the slope of that portion of the impedance curve $Z_1$ between the low impedance point B and the high impedance point A is changed, while by varying resistor 21 the slope of that portion of impedance curve $Z_2$ between the low impedance point F and the high impedance point E is changed. Since the resistors 20 and 21 are ganged and are identically variable, the characteristic curves for each of the two crystals are varied in like manner. When the values of resistance of resistors 20 and 21 are increased in unison, the phase curves will be widened and the slope of the impedance curves decreased to increase the bandwidth of the selective circuit, while when the resistance values of resistors 20 and 21 are decreased in unison, the phase curves will be narrowed and the slope of the impedance curves increased to decrease the bandwidth of the circuit. Thus, it may be seen that variable selectivity can be obtained in a simple manner, by merely varying or adjusting the resistance values of resistors 20 and 21.

What I claim to be my invention is as follows:

1. A selective circuit, comprising a source of input signals, a pair of electron control devices each having an input circuit and output electrodes, means coupling said output electrodes to a common output circuit, a separate piezoelectric crystal coupled to said source and to the input circuit of each of said devices, said crystals having predetermined slightly different resonant frequencies, and a separate variable resistor connected directly across each of said crystals to enable changing of the phase vs. frequency characteristic of each of said crystals, the two resistors being variable in unison to change the two characteristics in like manner.

2. A selective circuit comprising a source of input signals, a pair of electron discharge devices each having a control grid and output electrodes, means coupling said output electrodes to a common output circuit, a pair of piezoelectric crystals one connected in series between said source and the control grid of each respective discharge device, said crystals having predetermined slightly different resonant frequencies, a variable resistor connected directly across each of the crystals to enable changing of the phase vs. frequency characteristic of each of said crystals, and means for varying the two resistors in unison to change in like manner the two characteristics.

WALTER LYONS.

References Cited in the file of this patent

UNITED STATES PATENTS

| Number | Name | Date |
|---|---|---|
| 1,908,558 | Robinson | May 9, 1933 |
| 2,240,142 | Lovell | Apr. 29, 1941 |
| 2,256,078 | Crosby | Sept. 16, 1941 |
| 2,265,826 | Wheeler | Dec. 9, 1941 |
| 2,280,569 | Crosby | Apr. 21, 1942 |
| 2,282,101 | Tunick | May 5, 1942 |
| 2,374,735 | Crosby | May 1, 1945 |

FOREIGN PATENTS

| Number | Country | Date |
|---|---|---|
| 705,788 | France | June 12, 1931 |